United States Patent
Kawai et al.

(10) Patent No.: US 9,723,207 B2
(45) Date of Patent: Aug. 1, 2017

(54) IMAGING DEVICE AND CONTROL METHOD THEREFOR

(71) Applicant: FUJIFILM Corporation, Tokyo (JP)

(72) Inventors: Tomoyuki Kawai, Saitama (JP); Shigeru Kondo, Saitama (JP); Kenshi Imamura, Saitama (JP); Kousuke Irie, Saitama (JP); Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/287,709

(22) Filed: Oct. 6, 2016

(65) Prior Publication Data
US 2017/0026579 A1    Jan. 26, 2017

Related U.S. Application Data

(63) Continuation of application No. PCT/JP2015/060346, filed on Apr. 1, 2015.

(30) Foreign Application Priority Data

Apr. 10, 2014   (JP) ................................ 2014-081427

(51) Int. Cl.
   *H04N 5/232*        (2006.01)
   *G03B 13/06*        (2006.01)
   (Continued)

(52) U.S. Cl.
   CPC ......... *H04N 5/23245* (2013.01); *G03B 13/06* (2013.01); *G03B 13/08* (2013.01);
   (Continued)

(58) Field of Classification Search
   CPC ........... H04N 5/23293; H04N 5/23245; H04N 5/2351; H04N 5/2353; H04N 5/23209;
   (Continued)

(56) References Cited

U.S. PATENT DOCUMENTS

| 8,184,198 B2* | 5/2012 | Katayama | .............. G03B 13/36 |
| | | | 348/333.02 |
| 8,670,061 B2* | 3/2014 | Sakurabu | ........... H04N 5/23293 |
| | | | 348/333.01 |

(Continued)

FOREIGN PATENT DOCUMENTS

| JP | 2000292831 | 10/2000 |
| JP | 2003283886 | 10/2003 |

(Continued)

OTHER PUBLICATIONS

"Written Opinion of the International Searching Authority of PCT/JP2015/060346", mailed on Jul. 7, 2015, with English translation thereof, pp. 1-7.

(Continued)

*Primary Examiner* — Michael Osinski
(74) *Attorney, Agent, or Firm* — Jianq Chyun IP Office

(57) ABSTRACT

Provided is an imaging device that prevents glare resulting from light that leaks out from a subject display area of a display section in an OVF mode.
A finder device can be switched between the OVF mode and an EVF mode. A subject display area and an information display area are set in an EVFLCD. In the OVF mode, nothing is displayed in the subject display area of the EVFLCD, and an information image is displayed in the information display area. An EVF shutter is set such that the light transmittance of a first area, which corresponds to the subject display area, becomes a low transmittance and the light transmittance of a second area, which corresponds to the information display area, becomes a high transmittance. The first area, which is set at low transmittance, blocks light that leaks from the subject display area.

12 Claims, 15 Drawing Sheets

(51) Int. Cl.
*H04N 5/235* (2006.01)
*G03B 13/08* (2006.01)

(52) U.S. Cl.
CPC ......... *H04N 5/2351* (2013.01); *H04N 5/2353* (2013.01); *H04N 5/23293* (2013.01)

(58) Field of Classification Search
CPC .. H04N 5/23241; G03B 17/20; G03B 17/565; G03B 13/02–13/08
See application file for complete search history.

(56) References Cited

U.S. PATENT DOCUMENTS

| | | | | |
|---|---|---|---|---|
| 8,872,957 B2 * | 10/2014 | Jogetsu | ................ | G03B 13/04 348/333.01 |
| 9,066,008 B2 * | 6/2015 | Ishitsuka | ............ | H04N 5/23216 |
| 9,386,227 B2 * | 7/2016 | Irie | .................... | H04N 5/23293 |
| 9,497,385 B2 * | 11/2016 | Horii | ...................... | H04N 5/225 |
| 2001/0043277 A1 * | 11/2001 | Tanaka | ............... | H04N 5/23293 348/333.01 |
| 2008/0297639 A1 * | 12/2008 | Honjo | .................... | G03B 13/30 348/333.05 |
| 2009/0009617 A1 * | 1/2009 | Ito | ...................... | H04N 5/23245 348/222.1 |
| 2009/0309807 A1 * | 12/2009 | Matsumoto | ............ | G06F 3/1431 345/1.1 |
| 2012/0314117 A1 * | 12/2012 | Irie | ................... | H04N 5/23212 348/333.02 |
| 2014/0293111 A1 * | 10/2014 | Shintani | ............. | H04N 5/23293 348/333.09 |
| 2014/0333819 A1 * | 11/2014 | Aoki | ...................... | G03B 13/06 348/333.09 |
| 2015/0103217 A1 * | 4/2015 | Fujita | ..................... | G03B 13/06 348/294 |
| 2015/0244925 A1 * | 8/2015 | Kawai | ...................... | G02B 7/34 348/349 |
| 2015/0304546 A1 * | 10/2015 | Izawa | ...................... | G02B 7/34 348/229.1 |
| 2016/0037076 A1 * | 2/2016 | Fukushima | .......... | H04N 5/2351 348/333.02 |
| 2016/0073030 A1 * | 3/2016 | Park | .................... | H04N 5/23293 348/207.11 |
| 2016/0227105 A1 * | 8/2016 | Kobayashi | ......... | H04N 5/23216 |
| 2016/0309092 A1 * | 10/2016 | Feinberg | ............ | H04N 5/23216 |
| 2017/0004777 A1 * | 1/2017 | Imamura | ................ | G09G 3/342 |

FOREIGN PATENT DOCUMENTS

| | | |
|---|---|---|
| JP | 2012-065294 | 3/2012 |
| WO | 2013042420 | 3/2013 |

OTHER PUBLICATIONS

"First Office Action of China Counterpart Application" with English translation thereof, issued on Mar. 30, 2017, p. 1-p. 10.

* cited by examiner

IMAGING DEVICE AND CONTROL METHOD THEREFOR

CROSS-REFERENCE TO RELATED APPLICATION

This application is a Continuation of PCT International Application PCT/JP2015/060346 filed on 1 Apr. 2015, which claims priority under 35 USC 119(a) from Japanese Patent Application No. 2014-081427 filed on 10 Apr. 2014. The above application is hereby expressly incorporated by reference, in its entirety, into the present application.

BACKGROUND OF THE INVENTION

1. Field of the Invention

The present invention relates to an imaging device having a hybrid finder and a control method therefor.

2. Description of the Related Art

Recently, imaging devices such as a digital camera having a hybrid finder that has an optical viewfinder (hereinafter referred to as an OVF) mode and an electronic viewfinder (hereinafter referred to as an EVF) mode and that is capable of switching mode between both modes have become known (refer to JP2012-065294A).

The hybrid finder comprises a display section, a finder window, and a half mirror (an optical path combining section). The display section displays a subject image which is obtained by capturing an optical image of a subject through an imaging element. The optical image of the subject is incident onto the finder window. The half mirror transmits and guides a part of the optical image incident onto the finder window to a finder eyepiece section, and reflects and guides apart of a display image, which is displayed by the display section, to the finder eyepiece section. Further, the hybrid finder has a shutter (hereinafter referred to as an OVF shutter) that blocks the optical image which is incident onto the finder window. In the OVF mode, the OVF shutter is opened, the display section is set to a non-display state, and thereby the optical image is guided into the finder eyepiece section. In the EVF mode, the OVF shutter is closed, the display section is set to a display state, and thereby the display image is guided into the finder eyepiece section.

The display section has a subject display area and an information display area. A subject image is displayed in the subject display area. An information image of imaging conditions (a shutter speed, an aperture value, an ISO sensitivity, and the like) is displayed in the information display area. The subject display area is set at the center of the display image. The information display area is set to have a frame shape surrounding the subject display area. In the EVF mode, the hybrid finder displays images in both the subject display area and the information display area. In contrast, in the OVF mode, the subject image in the subject display area is not displayed, the information image in the information display area is displayed, the optical image and the information image are guided into the finder eyepiece section through the optical path combining section, and thereby the information image is displayed by being superimposed upon the optical image.

The display section includes a liquid crystal panel, a liquid crystal display device that has a backlight illuminating the liquid crystal panel with light, and a self-light-emitting display device such as an organic electro luminescence (EL) display.

In the hybrid finder, a part of the display image, which is displayed on the display section, is reflected by the optical path combining section (half mirror), and is guided into the finder eyepiece section, and therefore, a part of the display image is transmitted. As a result, a light amount thereof decreases. Hence, as the display section, it is preferable to use a display section that displays a display image having a large light amount, and it is preferable to use a liquid crystal display device having a larger light amount than a self-light-emitting display device having a smaller light amount.

In the liquid crystal display device, in the OVF mode, an information image is displayed such that a light transmittance of a liquid crystal panel corresponding to the information display area is set as a high transmittance, a subject image not being displayed by blocking light of a backlight such that the light transmittance of the liquid crystal panel corresponding to the subject display area is set as a low transmittance. However, even assuming that the light transmittance of the liquid crystal panel is set as a low transmittance, the light of the backlight is not completely blocked, and the light of the backlight slightly leaks from the subject display area. The light, which leaks out from the subject display area, is guided into the finder eyepiece section through the optical path combining section, and is taken into the optical image.

SUMMARY OF THE INVENTION

An object of the present invention is to provide an imaging device that prevents glare resulting from light that leaks out from a subject display area of the display section in the OVF mode, and a control method therefor.

In order to achieve the above-mentioned object, the imaging device of the present invention comprises an imaging element, a finder window, a display section, an optical path combining section, a finder eyepiece section, an optical shutter, a dimming section, and a control section. The imaging element captures an optical image of a subject, thereby generating image data. The optical image is incident onto the finder window, and the subject display area and the information display area are set in the display section. The display section displays a subject image based on the image data in the subject display area, and displays an information image based on imaging information in the information display area. The optical path combining section obtains a third optical path by combining a first optical path, along which the optical image incident through the finder window propagates, and a second optical path along which a display image displayed on the display section propagates. The finder eyepiece section is disposed on the third optical path. The optical shutter is provided on the first optical path. The dimming section is provided on the second optical path. The dimming section makes a light transmittance corresponding to the subject display area variable at least between a low transmittance and a high transmittance. The control section makes an optical viewfinder mode and an electronic viewfinder mode executable. In the optical viewfinder mode, in a state where the optical shutter is open, the information image is displayed, and the subject image is not displayed, whereby the optical image and the information image are guided into the finder eyepiece section. In the electronic viewfinder mode, in a state where the optical shutter is closed, the information image and the subject image are displayed, whereby the information image and the subject image are guided into the finder eyepiece section. The control section sets the light transmittance, which corresponds to the subject display area of the dimming section, as the low transmittance in the optical viewfinder mode.

In the display section, not only the subject display area and the information display area but also a sub-display area is set. The sub-display area is smaller than the subject display area. The control section makes a hybrid mode executable. In the hybrid mode, in a state where the optical shutter is open, the information image is displayed in the information display area, the subject image is displayed in the sub-display area, and the subject image is not displayed in the subject display area, whereby the optical image, the information image, and the subject image are guided into the finder eyepiece section. It is preferable that the control section sets the light transmittance, which corresponds to the subject display area of the dimming section, as the low transmittance in the hybrid mode.

In the optical viewfinder mode, the control section allows a first frame, which indicates an imaging area, and a second frame, which indicates a focus position, to be displayed in the subject display area. It is preferable that, in the optical viewfinder mode, the control section sets the light transmittance, which corresponds to the subject display area, as the high transmittance, in a case where at least one of the first frame and the second frame is displayed.

The imaging device comprises a luminance detection section that detects a luminance of the subject on the basis of the image data. The dimming section makes the light transmittance be variable in a stepwise manner between the low transmittance and the high transmittance. It is preferable that, in the optical viewfinder mode, the control section sets the light transmittance, which corresponds to the subject display area, as a value corresponding to the luminance.

The imaging device comprises a luminance detection section that detects a luminance of the subject on the basis of the image data. It is preferable that, in the optical viewfinder mode, the control section sets the light transmittance, which corresponds to the subject display area, as the high transmittance in a case where the luminance is equal to or greater than a predetermined value.

The imaging device comprises an illuminance detection section that detects an ambient illuminance. It is preferable that, in the optical viewfinder mode, the control section sets the light transmittance, which corresponds to the subject display area, as the high transmittance in a case where the illuminance is equal to or greater than a predetermined value.

It is preferable that the information display area is set to have a frame shape surrounding the subject display area.

It is preferable that the information display area is set to have a frame shape surrounding the subject display area. It is preferable that the sub-display area is positioned such that a center of the sub-display area deviates from a center of the subject display area.

It is preferable that the optical path combining section is a half mirror.

It is preferable that the dimming section is a liquid crystal shutter.

It is preferable that the imaging information includes at least any one of a shutter speed, an aperture value, and an ISO sensitivity.

There is provided a control method for an imaging device including an imaging element that generates image data by capturing an optical image of a subject, a finder window through which the optical image is incident, a display section in which a subject display area and an information display area are set and which displays a subject image based on the image data in the subject display area and displays an information image based on imaging information in the information display area, an optical path combining section that obtains a third optical path by combining a first optical path, along which the optical image incident through the finder window propagates, and a second optical path along which a display image displayed on the display section propagates, a finder eyepiece section that is disposed on the third optical path, an optical shutter that is provided on the first optical path, and a dimming section that is provided on the second optical path so as to make a light transmittance corresponding to the subject display area variable at least between a low transmittance and a high transmittance. The control method comprises executing an optical viewfinder mode and an electronic viewfinder mode selectively, and setting the light transmittance, which corresponds to the subject display area of the dimming section, as the low transmittance in the optical viewfinder mode, where the optical viewfinder mode is a mode of displaying the information image and not displaying the subject image so as to guide the optical image and the information image into the finder eyepiece section in a state where the optical shutter is open by controlling the optical shutter and the display section, and the electronic viewfinder mode is a mode of displaying the information image and the subject image so as to guide the information image and the subject image into the finder eyepiece section in a state where the optical shutter is closed.

According to the present invention, a dimming section is provided on the optical path along which the display image displayed on the display section propagates. The dimming section makes the light transmittance corresponding to the subject display area variable at least between the low transmittance and the high transmittance. In a case of displaying the information image in the OVF mode, the light transmittance corresponding to the subject display area of the dimming section is set as the low transmittance. Therefore, it is possible to prevent glare resulting from light, which leaks out from the subject display area of the display section, in the OVF mode.

DESCRIPTION OF THE PREFERRED EMBODIMENTS

First Embodiment

Figure 1:
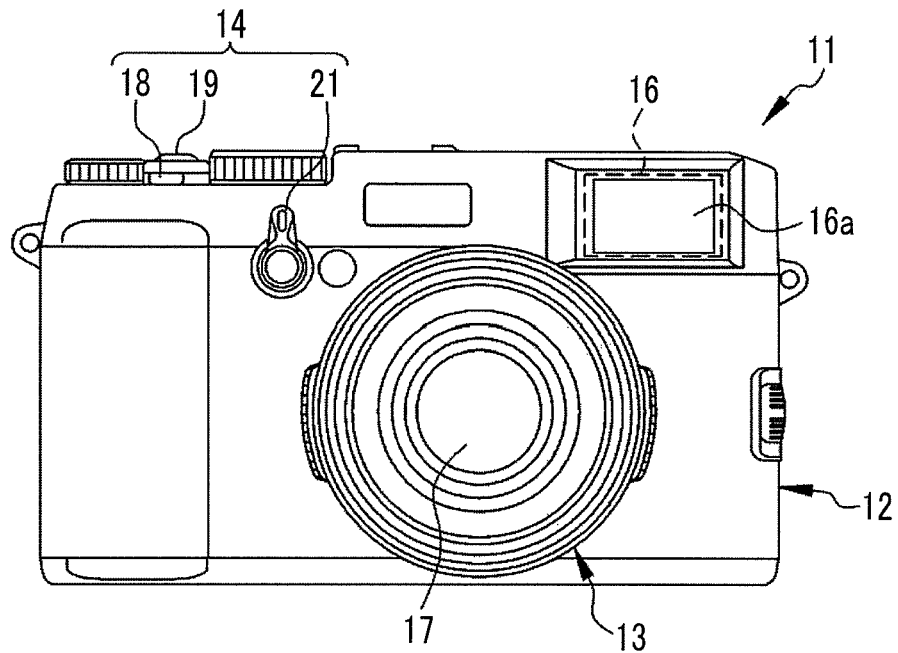
FIG. 1 is a front view of a digital camera.
Figure 2:
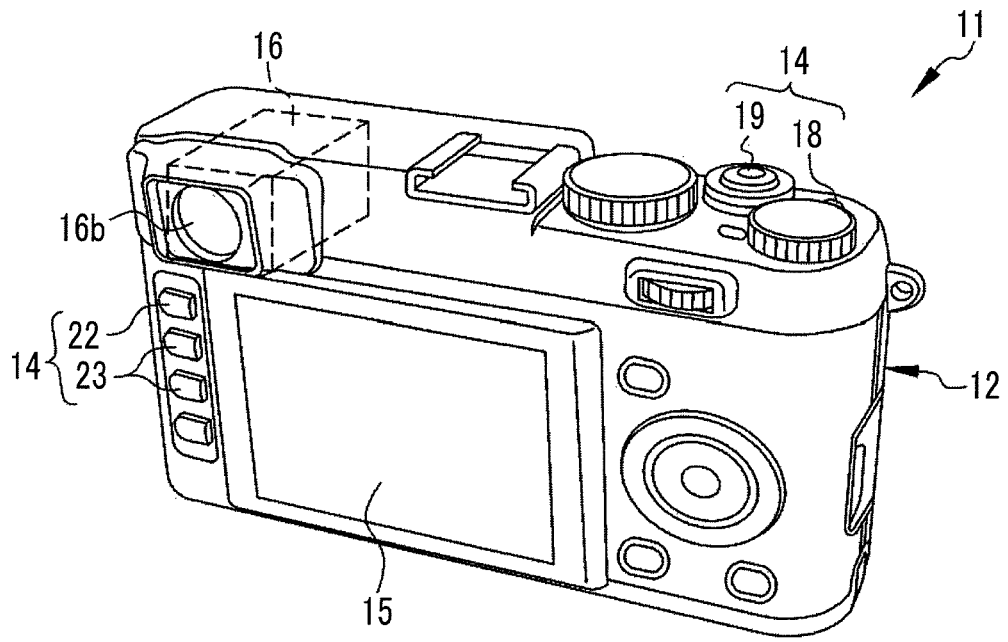
FIG. 2 is a perspective view of the rear side of the digital camera.

In FIGS. 1 and 2, the digital camera 11 comprises a camera main body 12, a lens barrel 13, an operation section 14, a rear side display section 15, and a finder device 16. The lens barrel 13 is provided on the front side of the camera main body 12 so as to hold an imaging lens 17. The finder device 16 is a hybrid type capable of switching between an optical viewfinder (OVF) mode and an electronic viewfinder (EVF) mode.

The operation section 14 has a power supply button 18, a release button 19, a finder switch lever 21, a mode selection button 22, a zoom button 23, and the like. The power supply button 18 is operated for the situation where a power source (not shown in the drawing) of the digital camera 11 is turned on/off. The release button 19 is operated for the situation where imaging is performed. The finder switch lever 21 is operated for the situation where the finder device 16 is switched between the OVF mode and the EVF mode. The mode selection button 22 is operated for the situation where the operation mode of the digital camera 11 is switched. The zoom button 23 is operated for the situation where zooming is performed.

The release button 19 has a two-stage-stroke-type switch (not shown in the drawing) including a S1 switch and a S2 switch. The digital camera 11 performs an imaging preparation operation such as an auto focus (AF) operation assuming that the release button 19 is pressed down (pressed halfway) and the S1 switch is turned on. From this state, assuming that the release button 19 is further pressed down (pressed fully) and the S2 switch is turned on, the digital camera 11 performs the imaging operation.

The operation modes of the digital camera 11 include a still image capturing mode, a moving image capturing mode, a reproduction mode, and the like. In the still image capturing mode, a still image is acquired. In the moving image capturing mode, a moving image is acquired. In the reproduction mode, each acquired image is reproduced and displayed on the rear side display section 15. The rear side display section 15 is provided on the rear side of the camera main body 12, and displays images acquired in various imaging modes and a menu screen for performing various settings.

The finder device 16 has a finder window 16a, which includes an optical image of a subject, and a finder eyepiece section 16b with which an eye of a user comes into contact. The finder window 16a is provided on the front side of the camera main body 12. The finder eyepiece section 16b is provided on the rear side of the camera main body 12.

Further, a slot (not shown in the drawing) for mounting a recording medium 40 (refer to FIG. 3) to be described later is provided on the bottom of the camera main body 12.

Figure 3:
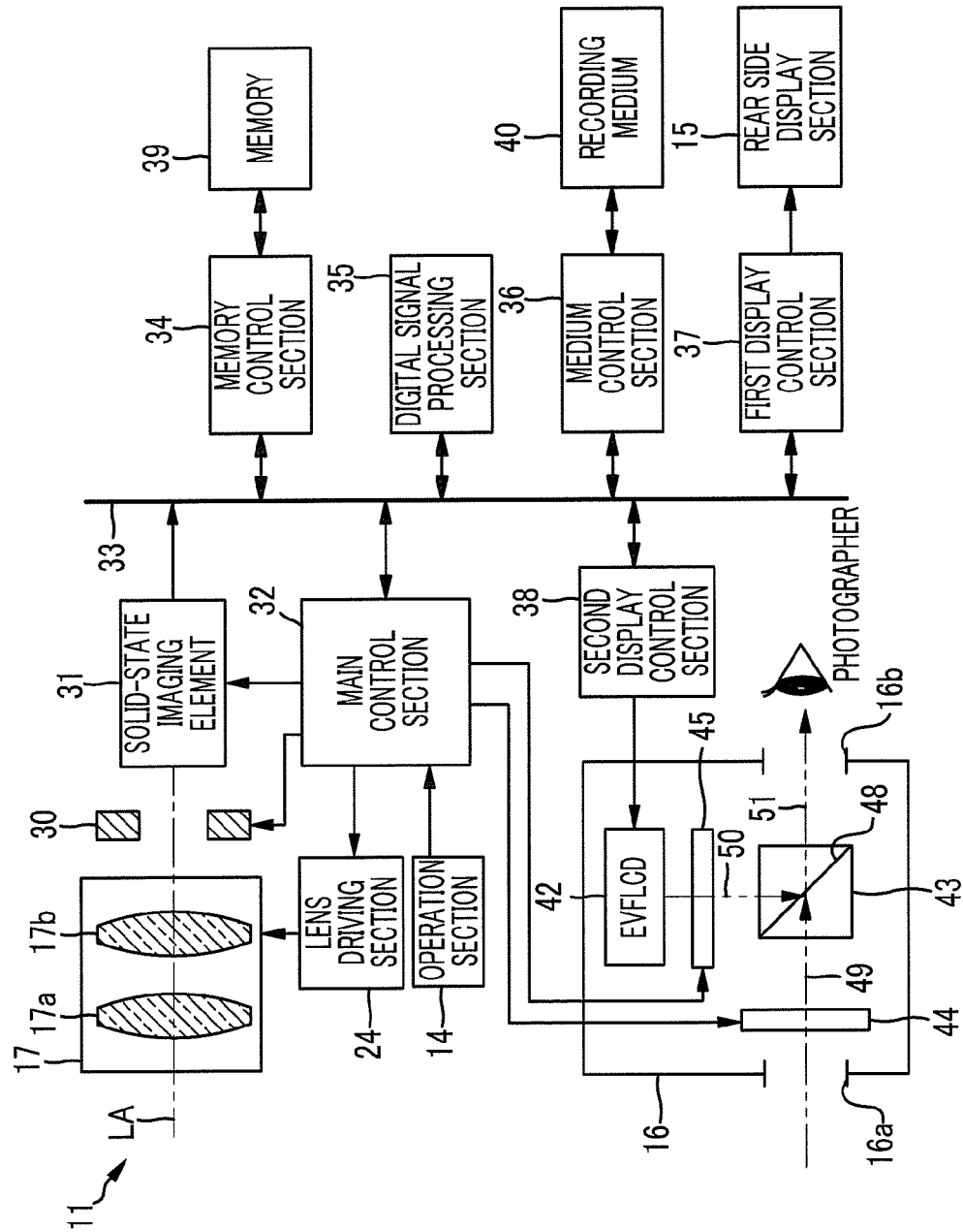
FIG. 3 is a block diagram illustrating an electrical configuration of the digital camera.

In FIG. 3, a diaphragm 30 and a solid-state imaging element 31 are provided along the optical axis LA of the imaging lens 17 in the lens barrel 13. The diaphragm 30 adjusts an amount of light, which is incident into the solid-state imaging element 31, through driving control performed by the main control section 32. An optical image of a subject, which passes through the imaging lens 17 and of which an amount of light is adjusted through the diaphragm 30, is incident into the solid-state imaging element 31.

The imaging lens 17 includes a zoom lens 17a, and a focus lens 17b. A lens driving section 24 is connected to the imaging lens 17. The lens driving section 24 moves the zoom lens 17a and the focus lens 17b along the optical axis direction, under the control of the main control section 32. Zooming is performed through driving of the zoom lens 17a, and an AF operation is performed through driving of the focus lens 17b.

The solid-state imaging element 31 is, for example, a CMOS (Complementary Metal Oxide Semiconductor) type image sensor having a single-plate color imaging type which has a RGB color filter, and has a light receiving surface formed of a plurality of pixels (not shown in the drawing) arranged in a two-dimensional matrix shape. Each pixel includes a photoelectric conversion element, and photoelectrically converts an optical image, which is formed on the light receiving surface, so as to generate a captured image signal. Further, the solid-state imaging element 31 has an electronic shutter function, and a shutter speed (electric charge accumulation time period) thereof can be adjusted.

Further, the solid-state imaging element 31 has a denoising circuit, an auto gain controller, and a signal processing circuit such as an analog-to-digital (A/D) conversion circuit (any of those is not shown in the drawing). The denoising circuit performs denoising processing on the captured image signal. The auto gain controller amplifies a level of the captured image signal to an optimum value. The A/D conversion circuit converts the captured image signal into a digital signal, and outputs the signal from the solid-state imaging element 31. The output signal of the solid-state imaging element 31 is image data (so-called RAW data) having one color signal for each pixel.

The solid-state imaging element 31 performs driving control through a main control section 32 in response to the operation mode which is selected by the mode selection button 22.

The solid-state imaging element 31 and the main control section 32 are connected to a bus 33. Otherwise, a memory control section 34, a digital signal processing section 35, a medium control section 36, a first display control section 37, and a second display control section 38 are connected to the bus 33.

A memory 39 for a temporary storage such as synchronous dynamic random access memory (SDRAM) is connected to the memory control section 34. The memory control section 34 inputs the image data, which is output from the solid-state imaging element 31, to the memory 39, and stores the image data. Further, the memory control section 34 outputs the image data, which is stored in the memory 39, to the digital signal processing section 35.

The digital signal processing section 35 performs defect correction processing, demosaic processing, gamma correction processing, white balance correction processing, YC conversion processing, and the like on the image data (RAW data) which is input from the memory 39, and generates YC image data formed of a luminance signal Y and a color difference signal C.

The medium control section 36 controls recording of image files into the recording medium 40 and reading of the image files from the recording medium 40. The recording medium 40 is, for example, a memory card into which a flash memory and the like are built.

In a case of the still image capturing mode, as the image files, for example, compressed image data, which is obtained by compressing the YC image data in conformity with the joint photographic experts group (JPEG) standard, is recorded into the recording medium 40. Further, in a case of the moving image capturing mode, moving image data, which is obtained by compressing the YC image data of a plurality of frames obtained through moving image capturing in conformity with the moving picture experts group (MPEG)-4 standard, is recorded into the recording medium 40. Such compression processing is performed by the digital signal processing section 35. In addition, in the case of the moving image capturing mode, in addition to the images, sound is acquired and recorded, but in the present embodiment, a description of a configuration for acquiring and recording sound will be omitted.

The first display control section 37 controls image display on the above-mentioned rear side display section 15.

Specifically, the first display control section 37 generates a video signal complying with the national television system committee (NTSC) standard on the basis of the YC image data, which is generated by the digital signal processing section 35, and outputs the signal to the rear side display section 15.

The second display control section 38 generates the video signal based on the YC image data in a manner similar to the first display control section 37, and outputs the signal to a liquid crystal display device (EVFLCD) 42 to be described later.

The finder device 16 is provided with the EVFLCD (display section) 42, a prism 43, an OVF shutter (optical shutter) 44, and an EVF shutter (dimming section) 45.

Figure 4:
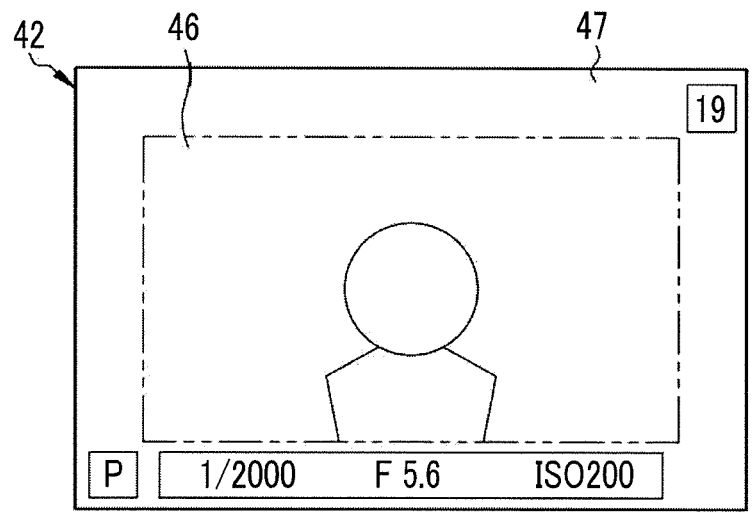
FIG. 4 is a diagram illustrating a subject display area and an information display area of an EVFLCD.

As shown in FIG. 4, in the EVFLCD 42, a subject display area 46, in which a subject image is displayed, and an information display area 47, in which an information image is displayed, are set. The information display area 47 is set to have a shape surrounding the subject display area 46. The subject image is a display image of YC image data which is generated by the digital signal processing section 35. The information image is a display image of information image data which is generated by the main control section 32. The information image data is generated on the basis of imaging information such as imaging conditions, the number of images which can be captured, and imaging modes.

The imaging conditions include a shutter speed, an aperture value, a sensitivity of international organization for standardization (ISO), and the like. The imaging modes include a program imaging mode, a manual imaging mode, and the like. In the program imaging mode, the shutter speed and the aperture value are automatically set on the basis of the image data which is obtained by capturing the optical image through the solid-state imaging element 31. In the manual imaging mode, a user operates the operation section 14, whereby the shutter speed and the aperture value can be manually set. The imaging conditions and the imaging modes can be set through the operation of the operation section 14.

In the information display area 47 shown in FIG. 4, the following are displayed: "1/2000" that indicates the shutter speed as an example of the imaging information, "F5.6" that indicates the aperture value, "ISO200" that indicates the ISO sensitivity, "P" that indicates the imaging modes, and "19" that indicates the number of images which can be captured.

A half mirror 48 as the optical path combining section is formed inside the prism 43. The half mirror 48 is disposed at an angle of 45 degrees to the first optical path 49 and the second optical path 50. In the first optical path 49, the optical image of the subject incident onto the finder window 16a propagates. In the second optical path 50, the display image displayed on the EVFLCD 42 propagates. The half mirror 48 obtains a third optical path 51 by combining the first optical path 49 and the second optical path 50. The finder eyepiece section 16b is disposed on the third optical path 51.

The half mirror 48 transmits a part of the optical image, which propagates on the first optical path 49, so as to guide the image into the third optical path 51, and reflects a part of the display image, which propagates on the second optical path 50, so as to guide the image into the third optical path 51. Thereby, the optical image and the display image are guided into the finder eyepiece section 16b.

The OVF shutter 44 is a liquid crystal shutter, and is disposed on the first optical path 49. The OVF shutter 44 is controlled by the main control section 32 such that it switches between "a closed state", in which the optical image incident from the finder window 16a is not incident into the prism 43 by blocking light of the optical image, and "an open state" in which the optical image is transmitted and incident into the prism 43. The OVF shutter 44 is set to the "open state" in the OVF mode, and is set to the "closed state" in the EVF mode.

The EVF shutter 45 is a liquid crystal shutter, and is disposed on the second optical path 50. An incident surface of the EVF shutter 45, on which light is incident, is set to be parallel with an exit surface from which the EVFLCD 42 emits light. Driving of the EVF shutter 45 is controlled by the main control section 32, and thereby the light transmittance is changed. The light transmittance is set to be a low transmittance at the time of driving the EVF shutter 45, and is set to be a high transmittance at the time of non-driving thereof.

Figure 5:
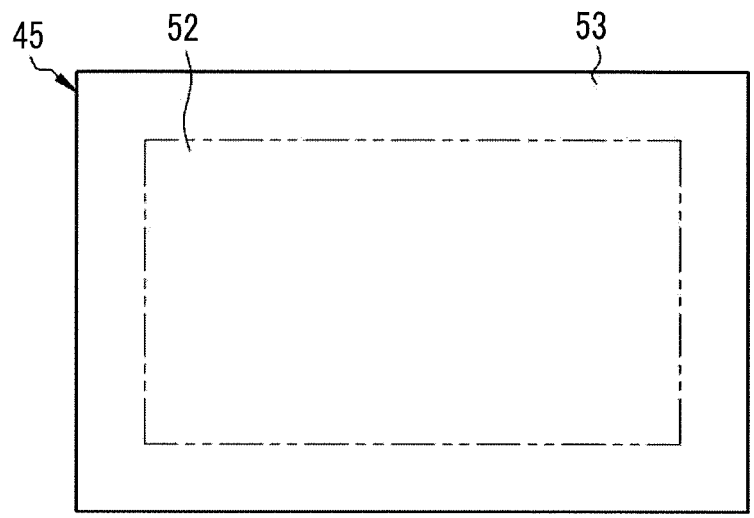
FIG. 5 is a diagram illustrating a first area and a second area of an EVF shutter.

As shown in FIG. 5, in the EVF shutter 45, a first area 52 corresponding to the subject display area 46 and a second area 53 corresponding to the information display area 47 are set. The light transmittances of the first area 52 and the second area 53 are controlled by the main control section 32 so as to be between a low transmittance (for example, 0%) and a high transmittance (for example, 100%).

The main control section 32 detects correspondence relationships between the subject display area 46 and the information display area 47 and the first area 52 and the second area 53. In the EVF mode, the EVF shutter 45 is set such that the light transmittances of the first area 52 and the second area 53 are the high transmittances. In contrast, in the OVF mode, the EVF shutter 45 is set such that the light transmittance of the first area 52 is the low transmittance and the light transmittance of the second area 53 is the high transmittance.

Figure 6:
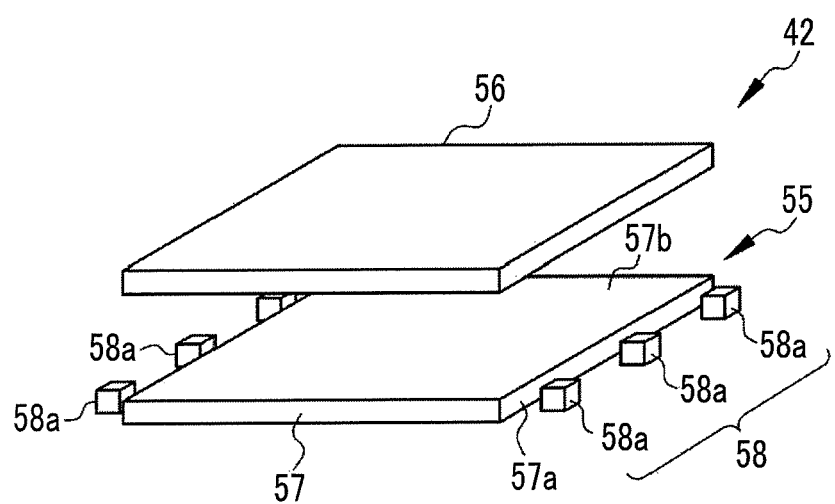
FIG. 6 is a perspective view illustrating a configuration of the EVFLCD.

As shown in FIG. 6, the EVFLCD 42 has a backlight 55 and a liquid crystal panel 56. The backlight 55 is an edge-light type that includes a light guide 57 having a rectangular plate shape and a light source group 58. The light source group 58 is formed of a plurality of light sources 58a which are arranged along the two sides of the light guide 57 opposite to each other. Each light source 58a includes a light emitting diode.

The light guide 57 is formed of a transparent resin (a methacryl resin, an acryl resin, a polycarbonate resin, or the like) having a high light transmittance. The side surfaces of the light guide 57, toward which the light source group 58 faces, are incidence end faces 57a to which light emitted from the light sources 58a are incident. The upper surface of the light guide 57 is an exit surface 57b from which light is emitted. The exit surface 57b faces the liquid crystal panel 56, and irradiates the surface of the liquid crystal panel 56 with light.

The liquid crystal panel 56 has a transmissive liquid crystal panel having a plurality of liquid crystal cells, and controls a light transmittance of each liquid crystal cell, on the basis of a video signal which is input from the second display control section 38. At this time, image display is performed by using light which is emitted from the backlight 55 and is transmitted through the liquid crystal panel 56.

The second display control section 38 generates video signals different between the EVF mode and the OVF mode. In the EVF mode, the second display control section 38 generates a video signal on the basis of the YC image data and the information image data. Specifically, the second display control section 38 detects area information of the subject display area 46 and the information display area 47 of the EVFLCD 42, displays a subject image in the subject display area 46, and generates a video signal for displaying an information image in the information display area 47. Regarding signal values of parts corresponding to the information display area 47 of the video signal, signal values of a part indicating imaging information such as texts are at the maximum gray (white) level, and signal values of the other part are at the minimum gray (black) level.

In the OVF mode, the second display control section 38 generates a video signal on the basis of only the information image data. Specifically, the second display control section 38 generates the video signal for displaying nothing in the subject display area 46 and displaying the information image in the information display area 47. The signal values of a part corresponding to the subject display area 46 of the video signal are at the black level. Further, in a manner similar to that of the above-mentioned EVF mode, regarding the signal values of the parts corresponding to the information display area 47 of the video signal, the signal values of the part indicating the imaging information are at the white level, and the signal values of the other part are at the black level.

The EVFLCD 42 changes light transmittances of liquid crystal cells, on the basis of the input video signals. Specifically, in the EVFLCD 42, the light transmittances of the liquid crystal cells are set as transmittances corresponding to respective signal values of the video signal. In particular, a signal value is set as the minimum transmittance, at the black level, and is set as the maximum transmittance, at the white level.

In such a manner, in the EVF mode, the subject image is displayed in the subject display area 46 of the EVFLCD 42, and the information image is displayed in the information display area 47. At this time, the first area 52 and the second area 53 of the EVF shutter 45 are set at high transmittances. Therefore, the subject image and the information image are transmitted through the EVF shutter 45, propagate on the second optical path 50, are reflected by the half mirror 48, and are guided into the third optical path 51. Since the OVF shutter 44 is set to the "closed state", the optical image is not incident onto the half mirror 48. As a result, the subject image and the information image shown in FIG. 4 are guided into the finder eyepiece section 16b.

Figure 7:
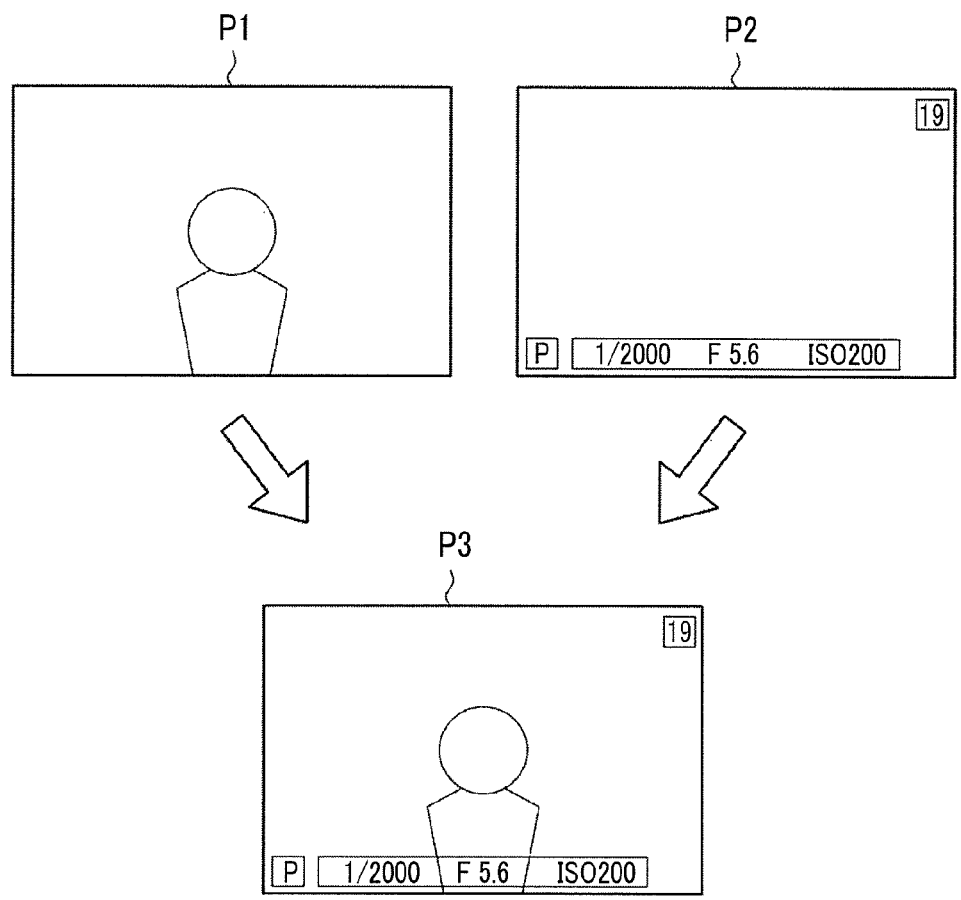
FIG. 7 is a diagram illustrating an OVF image in which an optical image and an information image overlap.

In contrast, in the OVF mode, the subject image is not displayed in the subject display area 46 and displayed in black, and the information image is displayed in the information display area 47. At this time, the first area 52 of the EVF shutter 45 is set at the low transmittance, and the second area 53 is set at the high transmittance. Therefore, only the information image is transmitted through the EVF shutter 45, propagates on the second optical path 50, is reflected by the half mirror 48, and is guided into the third optical path 51. Since the OVF shutter 44 is set to the "open state", the optical image is transmitted through the OVF shutter 44, propagates on the first optical path 49, is transmitted through the half mirror 48, and is guided into the third optical path 51. As a result, as shown in FIG. 7, an OVF image P3, in which an optical image P1 and an information image P2 overlap, is guided into the finder eyepiece section 16b.

In the OVF mode, nothing is displayed in the subject display area 46, but the light, which is emitted from the backlight 55, is not completely blocked by the liquid crystal panel 56, and light slightly leaks from the subject display area 46. In the present invention, the light, which leaks from the subject display area 46, is blocked by the first area 52 set at the low transmittance of the EVF shutter 45, and therefore glare of the light is prevented from being taken into the OVF image P3.

Figure 8:
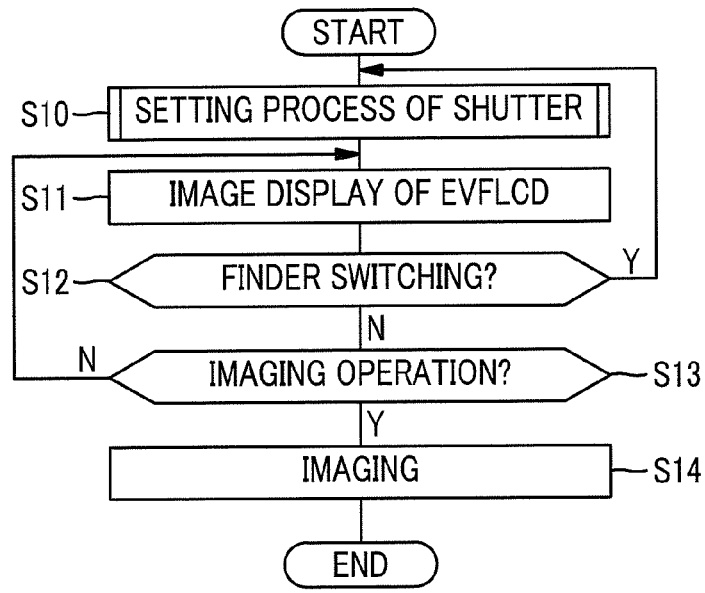
FIG. 8 is a flowchart explaining an effect of the digital camera.

Next, operations of the digital camera 11 will be described. First, assuming that a user operates the power supply button 18 so as to turn on the power, a power supply voltage is supplied to each section of the digital camera 11. Further, assuming that the operation section 14 is operated and for example the program imaging mode is selected as the imaging mode, the shutter speed and the aperture value are automatically set. Furthermore, assuming that the mode selection button 22 is operated and the still image imaging mode is selected, the finder device 16 starts operating. Assuming that the operation of the finder device 16 is started, as shown in FIG. 8, setting processes of the OVF shutter 44 and the EVF shutter 45 are performed on the basis of setting of the finder switch lever 21 (S10).

Figure 9:
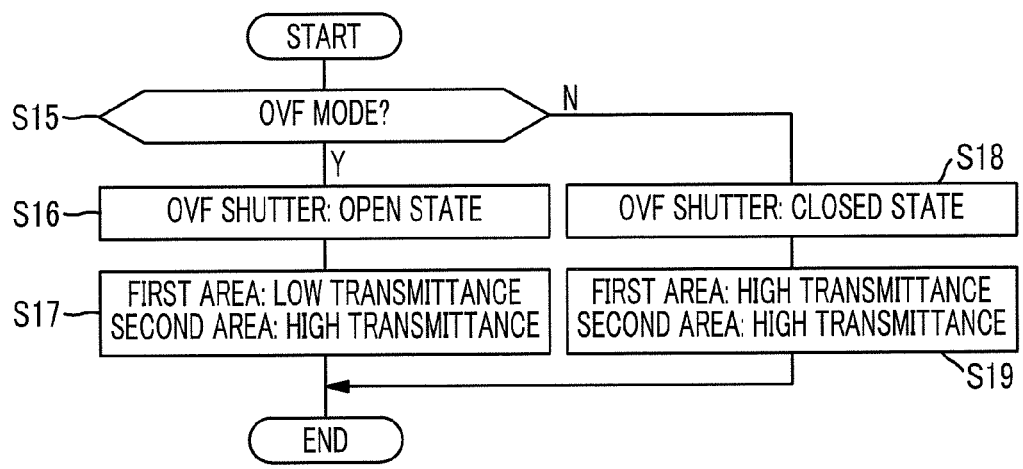
FIG. 9 is a flowchart explaining a setting process of a shutter.

Specifically, as shown in FIG. 9, the main control section 32 determines whether the setting of the finder switch lever 21 is the OVF mode or the EVF mode (S15). In a case where it is determined that the setting is the OVF mode, the OVF shutter 44 is set to the open state (S16). The first area 52 of the EVF shutter 45 is set as the low transmittance, and the second area 53 is set as the high transmittance (S17).

After the setting process, the image display of the EVFLCD 42 is performed (S11). Specifically, in the OVF mode, nothing is displayed in the subject display area 46, and the information image is displayed in the information display area 47. As a result, the optical image and the information image are guided into the finder eyepiece section 16b, and the OVF image is displayed. A user is able to check the imaging conditions while observing an optical image of a subject by making user's eyes close to the finder eyepiece section 16b.

Then, it is determined whether or not switching of the finder switch lever 21 is performed (S12). In a case where it is determined that switching is not performed, it is determined whether or not the imaging operation is performed (S13). The imaging operation is performed by fully pressing the release button 19. In a case where it is determined that the imaging operation is performed, imaging is performed under the imaging condition (S14). In a case where it is determined that the imaging operation is not performed, the process returns to step S11.

In contrast, in a case where it is determined that switching to the EVF mode is performed in step S12, the process returns to step S10. In the setting process of step S10, the OVF shutter 44 is set to the closed state (S18), and the first area 52 and the second area 53 of the EVF shutter 45 are set at the high transmittance (S19).

After the setting process, the subject image is displayed in the subject display area 46f the EVFLCD 42, and the information image is displayed in the information display area 47 (S11). As a result, the subject image and the information image are guided into the finder eyepiece section 16b. A user is able to check a subject image, which is actually obtained through imaging, by making user's eyes close to the finder eyepiece section 16b. The following steps S12 to S14 are as described above.

Second Embodiment

Figure 10:
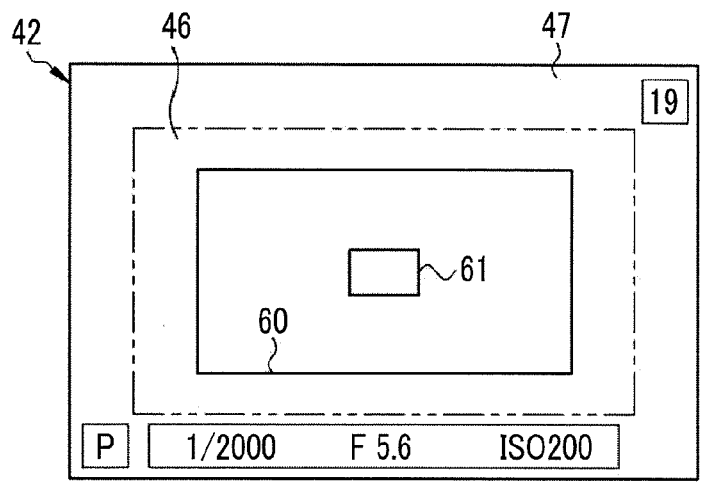
FIG. 10 is a diagram illustrating an angle-of-view frame and an AF frame.

In the first embodiment, in the OVF mode, nothing is displayed in the subject display area 46. In a second embodiment, in the OVF mode, as shown in FIG. 10, an angle-of-view frame (first frame) 60 and an AF frame (second frame) 61 can be displayed in the subject display area 46. Setting as to whether or not the angle-of-view frame 60 and the AF frame 61 are displayed can be performed through the operation of the operation section 14. Only one of the angle-of-view frame 60 and the AF frame 61 can also be displayed through the operation of the operation section 14.

The angle-of-view frame 60 indicates an area (imaging area) in which imaging is performed by the solid-state imaging element 31 in the OVF image. A size of the imaging area changes in accordance with the zooming using the operation of the zoom button 23.

The AF frame 61 indicates a target area (focus position) obtained for the situation where the AF operation is performed, in a captured image signal which is generated by the solid-state imaging element 31. The AF operation is performed by controlling driving of the focus lens 17b such that an AF evaluation value (value of summation of high-frequency components) included in the captured image signal corresponding to the AF frame 61 is maximized. The AF frame 61 is fixed at, for example, the center of the imaging area. Otherwise, the AF frame 61 is set through the operation section 14, or is set as a face part of a person which is detected through a face detection function.

Hereinafter, the AF frame 61 and the angle-of-view frame 60 displayed in the subject display area 46 are referred to as frame images. The frame images are displayed in the subject display area 46 on the basis of the frame image data which is generated by the main control section 32.

The second display control section 38 generates a video signal on the basis of the frame image data and the information image data. Specifically, the second display control section 38 generates the video signal for displaying the frame images in the subject display area 46 and displaying the information image in the information display area 47. Regarding signal values of the parts corresponding to the subject display area 46 of the video signal, signal values of parts indicating the angle-of-view frame 60 and the AF frame 61 are at the white level, and signal values of the other part are at the black level.

Figure 11:
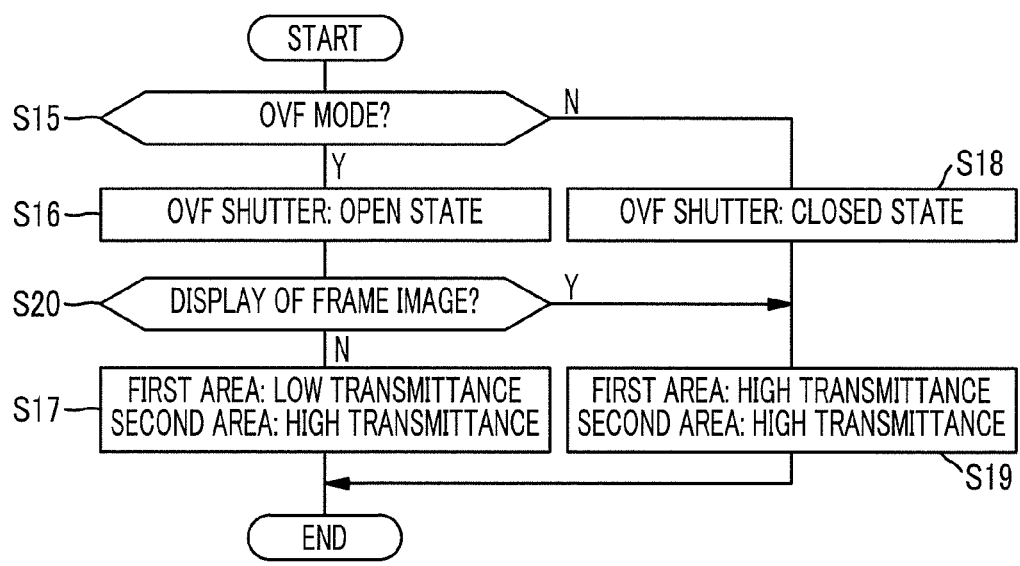
FIG. 11 is a flowchart explaining the setting process of the shutter for the situation where the angle-of-view frame and the AF frame are displayed.

As shown in FIG. 11, in a case where the frame image (at least one of the angle-of-view frame 60 or the AF frame 61) is displayed in the OVF mode (Y in S20), the EVF shutter 45 is set such that the light transmittances of the first area 52 and the second area 53 are high transmittances (S19).

Figure 12:
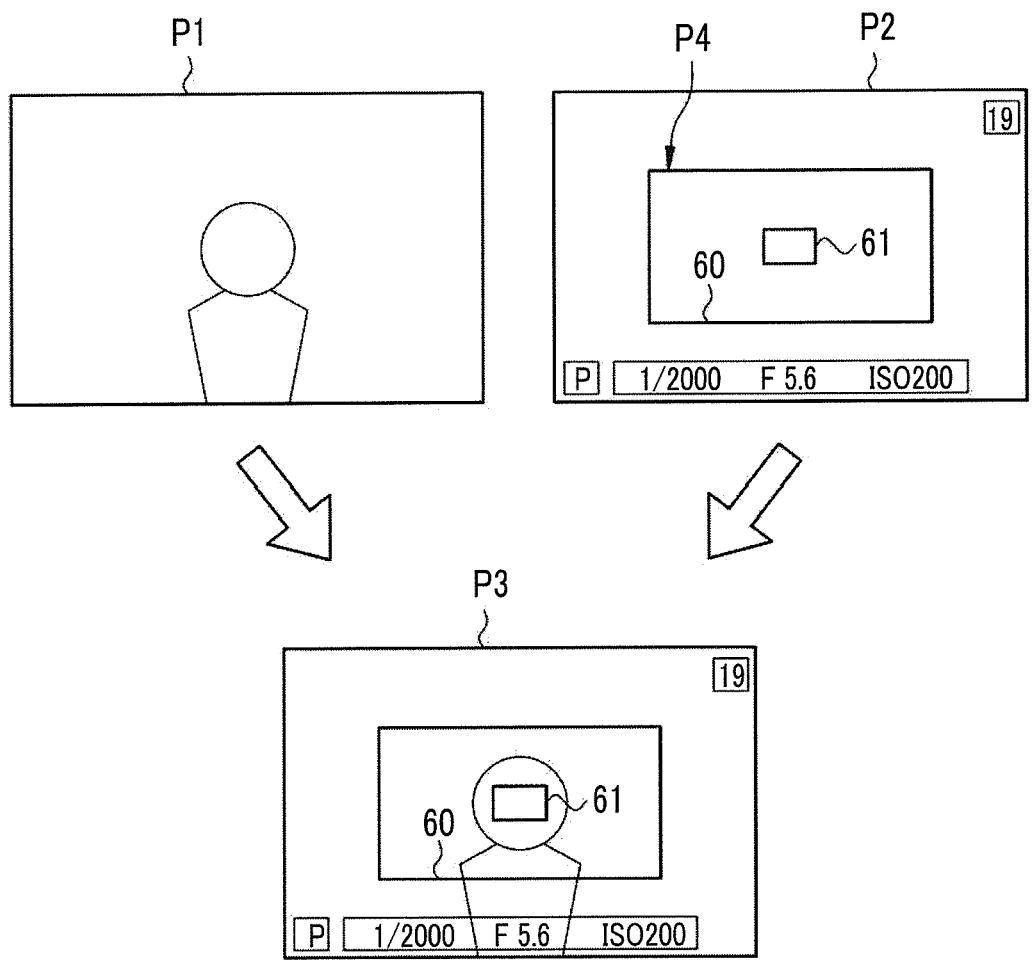
FIG. 12 is a diagram illustrating an OVF image in which the angle-of-view frame and the AF frame are displayed.

Assuming that the frame image is displayed in the subject display area 46 and the information image is displayed in the information display area 47, the first area 52 and the second area 53 of the EVF shutter 45 are set at the high transmittance. Therefore, the frame image and the information image are transmitted through the EVF shutter 45, propagate on the second optical path 50, are reflected by the half mirror 48, and are guided into the third optical path 51. Since the OVF shutter 44 is set to the "open state", the optical image is transmitted through the OVF shutter 44, propagates on the first optical path 49, is transmitted through the half mirror 48, and is guided into the third optical path 51. As a result, as shown in FIG. 12, an OVF image P3, in which an optical image P1, an information image P2, and a frame image P4 overlap, is guided into the finder eyepiece section 16b.

As a result, a user is able to check an imaging area through the angle-of-view frame 60 in the OVF image P3. Further, by using the AF frame 61 in the OVF image P3, focus is adjusted to a subject to be subjected to imaging. At the time of imaging, the angle-of-view frame 60 is set as the imaging area, whereby it is possible to obtain image data in which focus is adjusted to the AF frame 61.

In the second embodiment, the angle-of-view frame 60 and the AF frame 61 are displayed to have a frame shape surrounding a specific region. However, as the shape, any shape is used assuming that it is a display shape capable of recognizing the specific region. For example, only corner parts of the frame may be displayed.

Third Embodiment

In the first embodiment, in the OVF mode, the first area 52 of the EVF shutter 45 is set at the low transmittance, and light, which leaks out from the subject display area 46 of the EVFLCD 42, is blocked. In a third embodiment, in the OVF mode, in a case where the subject luminance value is equal to or greater than a predetermined value, the first area 52 is set at the high transmittance.

The digital signal processing section 35 detects a luminance for each pixel on the basis of the image data, and calculates an average luminance of the image data. Then, the digital signal processing section 35 outputs the calculated average luminance as a subject luminance value to the main control section 32. As described above, the digital signal processing section 35 functions as the luminance detection section.

Figure 13:
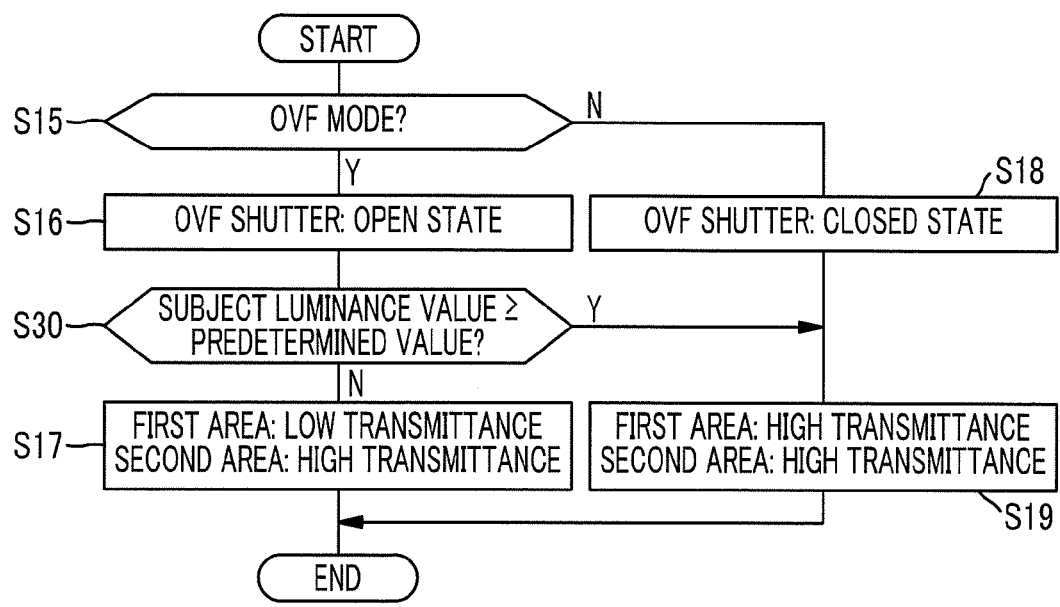
FIG. 13 is a flowchart explaining the setting process of the shutter based on a subject luminance value.

As shown in FIG. 13, in the OVF mode, the main control section 32 determines whether or not the subject luminance value which is input from the digital signal processing section 35 is equal to or greater than the predetermined value (S30). In a case where the subject luminance value is equal to or greater than the predetermined value, the first area 52 and the second area 53 of the EVF shutter 45 are set at the high transmittance (S19).

In the case where the subject luminance value is equal to or greater than the predetermined value, a light amount of the optical image is large, glare of light, which leaks out from the subject display area 46, is rarely taken, and it is scarcely necessary to block the light by setting the first area 52 of the EVF shutter 45 at the low transmittance. Hence, in the case where the subject luminance value is equal to or greater than the predetermined value, by setting the first area 52 at the high transmittance, it is possible to set the EVF shutter 45 to the non-driving state. As a result, power saving is achieved.

Fourth Embodiment

In the third embodiment, in the OVF mode, the light transmittance of the EVF shutter 45 is controlled on the basis of the subject luminance value. In a fourth embodiment, in the OVF mode, the light transmittance of the EVF shutter 45 is controlled on the basis of the ambient illuminance value.

Figure 14:
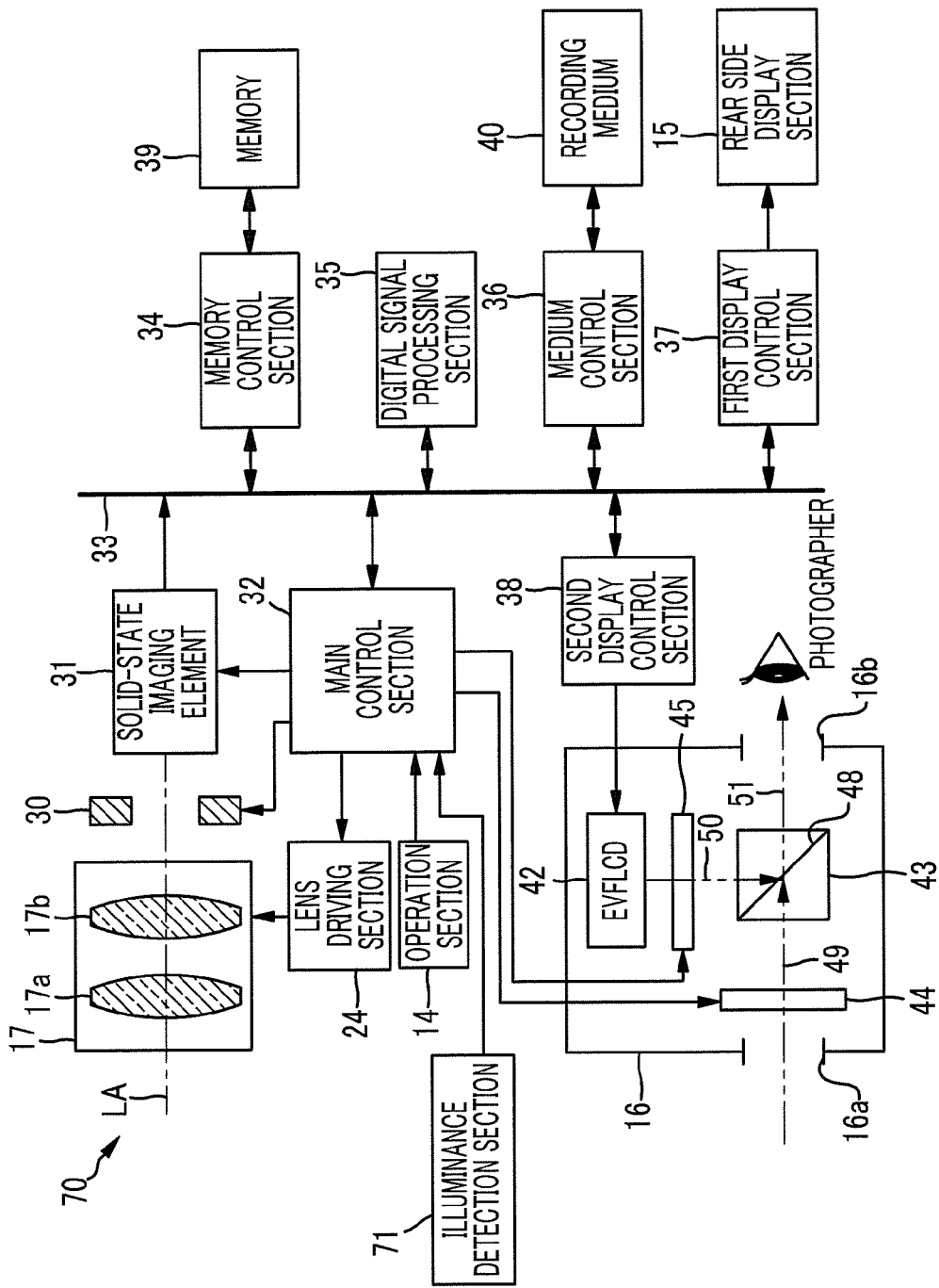
FIG. 14 is a block diagram illustrating an electrical configuration of the digital camera of a fourth embodiment.

As shown in FIG. 14, in the fourth embodiment, an illuminance detection section 71 such as an illuminance sensor is provided in a digital camera 70. The illuminance detection section 71 detects a luminance of the periphery of the digital camera 70, and outputs a degree of luminance as the illuminance value to the main control section 32.

Figure 15:
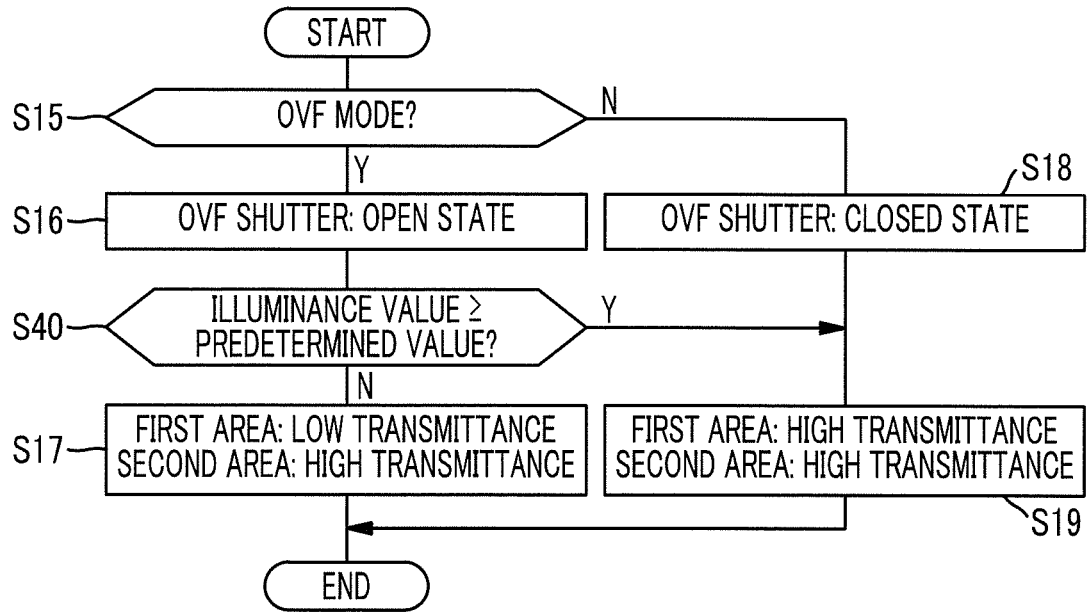
FIG. 15 is a flowchart explaining the setting process of the shutter based on an illuminance value.

As shown in FIG. 15, in the OVF mode, the main control section 32 determines whether or not the illuminance value which is input from the illuminance detection section 71 is equal to or greater than the predetermined value (S40). In a case where the illuminance value is equal to or greater than the predetermined value, the first area 52 and the second area 53 of the EVF shutter 45 are set at the high transmittance (S19).

In the case where the illuminance value is equal to or greater than the predetermined value, in a manner similar to the case where the subject luminance value is equal to or greater than the predetermined value, glare of light, which leaks out from the subject display area 46, is rarely taken. Hence, by setting the EVF shutter 45 to the non-driving state, it is possible to achieve power saving.

Fifth Embodiment

In the third and fourth embodiments, in the OVF mode, the light transmittance of the first area 52 of the EVF shutter 45 is set in two steps of the low transmittance (0%) and the high transmittance (100%) on the basis of the subject luminance value or the illuminance value. In a fifth embodiment, in the OVF mode, the light transmittance of the first area 52 is set in a stepwise manner on the basis of the subject luminance value or the illuminance value.

Hereinafter, an example, in which the light transmittance of the first area 52 is set on the basis of the subject luminance value, will be described. An example in which the light transmittance is set on the basis of the illuminance value is the same as the example in which the light transmittance is set on the basis of the subject luminance value, and a description thereof will be omitted.

In the present embodiment, the light transmittance of the first area 52 of the EVF shutter 45 is variable in a stepwise manner between 0% and 100%.

Figure 16:
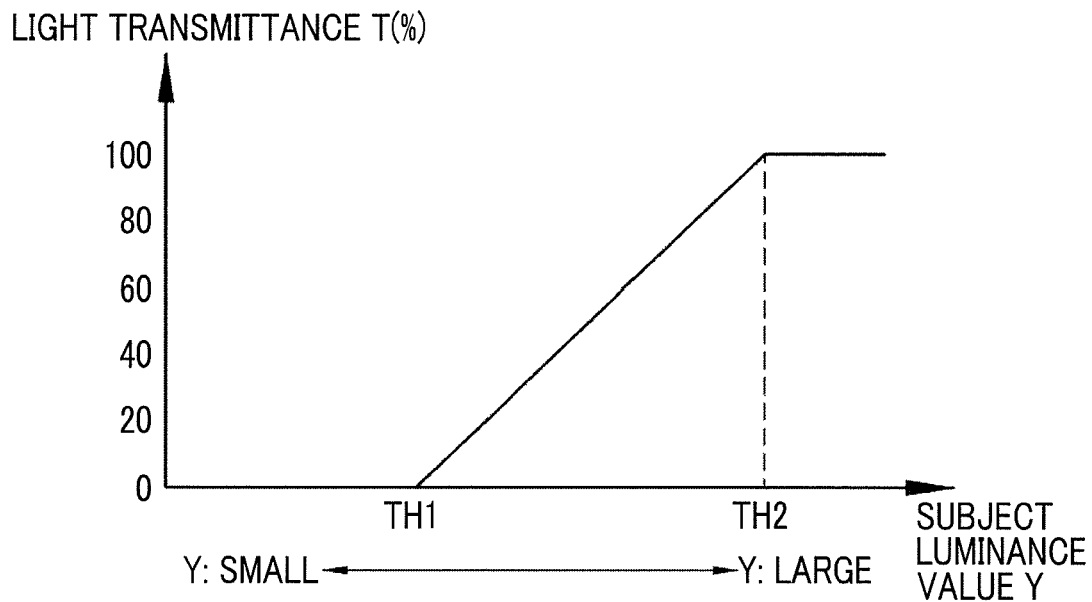
FIG. 16 is a diagram illustrating an example in which the light transmittance of the EVF shutter is set in a stepwise manner in accordance with the subject luminance value.

In the OVF mode, the main control section 32 sets a light transmittance T of the first area 52 of the EVF shutter 45, in accordance with the size of the subject luminance value Y which is input from the digital signal processing section 35. The light transmittance T is set, for example, as shown in FIG. 16, in accordance with the subject luminance value Y.

Specifically, a first threshold value TH1, and a second threshold value TH2 are provided. In a case where "Y<TH1" is satisfied, T=0%. In a case where "Y>TH2" is satisfied, T=100%. In a case where "TH1≤Y≤TH2" is satisfied, the light transmittance T is set in a stepwise manner in proportion to an increase in the subject luminance value Y.

As described above, in the fifth embodiment, in the OVF mode, the light transmittance T of the first area 52 is changed in a stepwise manner in proportion to the increase in the subject luminance value Y. Therefore, it is possible to effectively supply electric power for driving the EVF shutter 45, and it is possible to more effectively achieve power saving.

Figure 17:
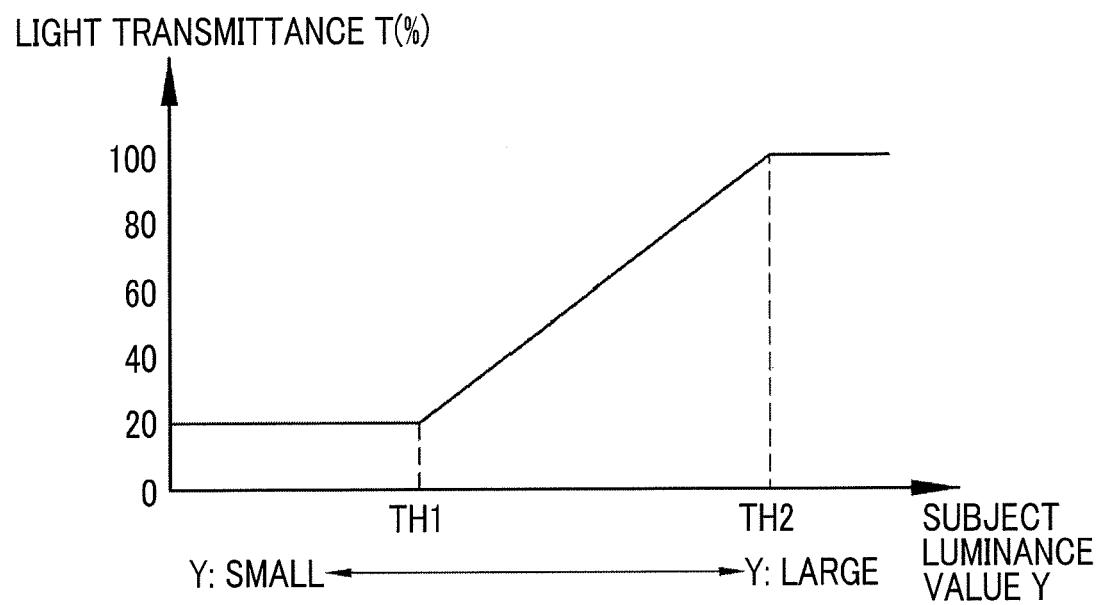
FIG. 17 is a diagram illustrating another example in which the light transmittance of the EVF shutter is set in a stepwise manner in accordance with the subject luminance value.

In addition, the configuration of the fifth embodiment may be applied to the second embodiment. In this case, the angle-of-view frame 60 or the AF frame 61 is displayed in the subject display area 46. Thus, for example, as shown in FIG. 17, in a case where "Y<TH1" is satisfied, it is preferable that the light transmittance T of the first area 52 is set as a predetermined value (for example, 20%). In the range of "TH1≤Y≤TH2", the light transmittance T is set in a stepwise manner in proportion to the increase in the subject luminance value Y. Therefore, the frame image is displayed to be bright in proportion to the increase in the subject luminance value Y. Thus, in the OVF image, the angle-of-view frame 60 or the AF frame 61 is displayed at an optimal luminance.

Sixth Embodiment

In the first embodiment, the following two modes are switched: the EVF mode capable of observing the subject image; and the OVF mode capable of observing the optical image. In a sixth embodiment, in addition to the EVF mode and the OVF mode, there is provided a hybrid mode capable of observing the subject image and the optical image. These three modes can be switched through the operation of the finder switch lever 21. Hereinafter, only the hybrid mode will be described. Since the EVF mode and the OVF mode are the same as those in the first embodiment, a description thereof will be omitted.

Figure 18:
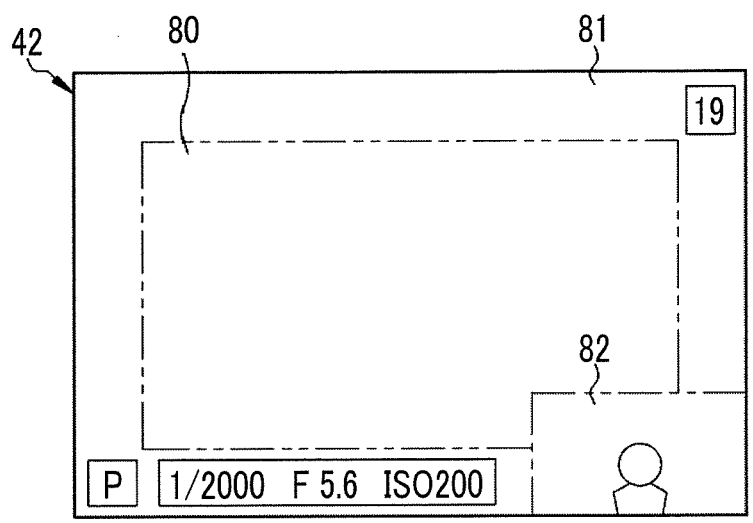
FIG. 18 is a diagram illustrating a subject display area, an information display area, and a sub-display area.

As shown in FIG. 18, in the EVFLCD 42, a subject display area 80, an information display area 81, and a sub-display area smaller than the subject display area 80 are set. The sub-display area 82 is set at, for example, the right bottom such that the center thereof deviates from that of the subject display area 80.

In the EVFLCD 42, a subject image is displayed in the subject display area 80 in the EVF mode, but a subject image is displayed in the sub-display area 82 in the hybrid mode. In the hybrid mode, nothing is displayed in the subject display area 80, and the information image is displayed in the information display area 81.

Figure 19:
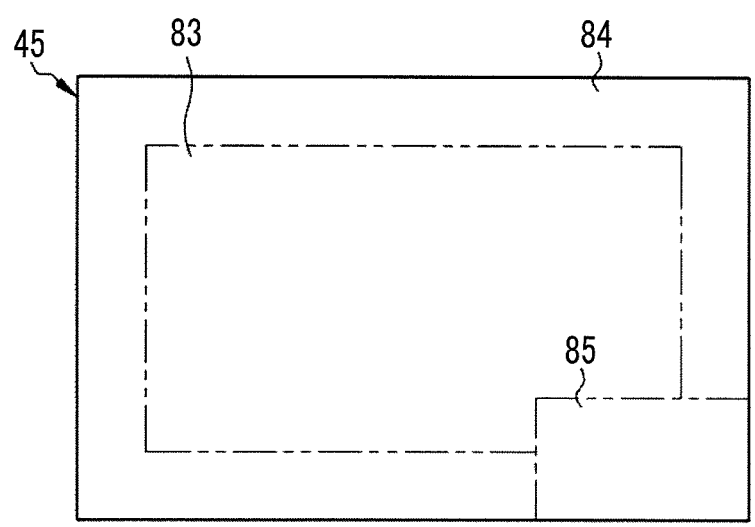
FIG. 19 is a diagram illustrating first to third areas.

As shown in FIG. 19, in the EVF shutter 45, a first area 83 corresponding to the subject display area 80, a second area 84 corresponding to the information display area 81, and a third area 85 corresponding to the sub-display area 82 are set.

The main control section 32 detects correspondence relationships between the subject display area 80 and the first area 83, the information display area 81 and the second area 84, and the sub-display area 82 and the third area 85. The light transmittance of the first area 83 is set as the low transmittance, and the light transmittances of the second area 84 and third area 85 are set as the high transmittances.

The second display control section 38 generates a video signal on the basis of the YC image data and the information image data. Specifically, the second display control section 38 detects area information of the subject display area 80, the information display area 81, and the sub-display area 82 of the EVFLCD 42, displays nothing in the subject display area 80, displays an information image in the information display area 81, and generates a video signal for displaying the subject image in the sub-display area 82.

Figure 20:
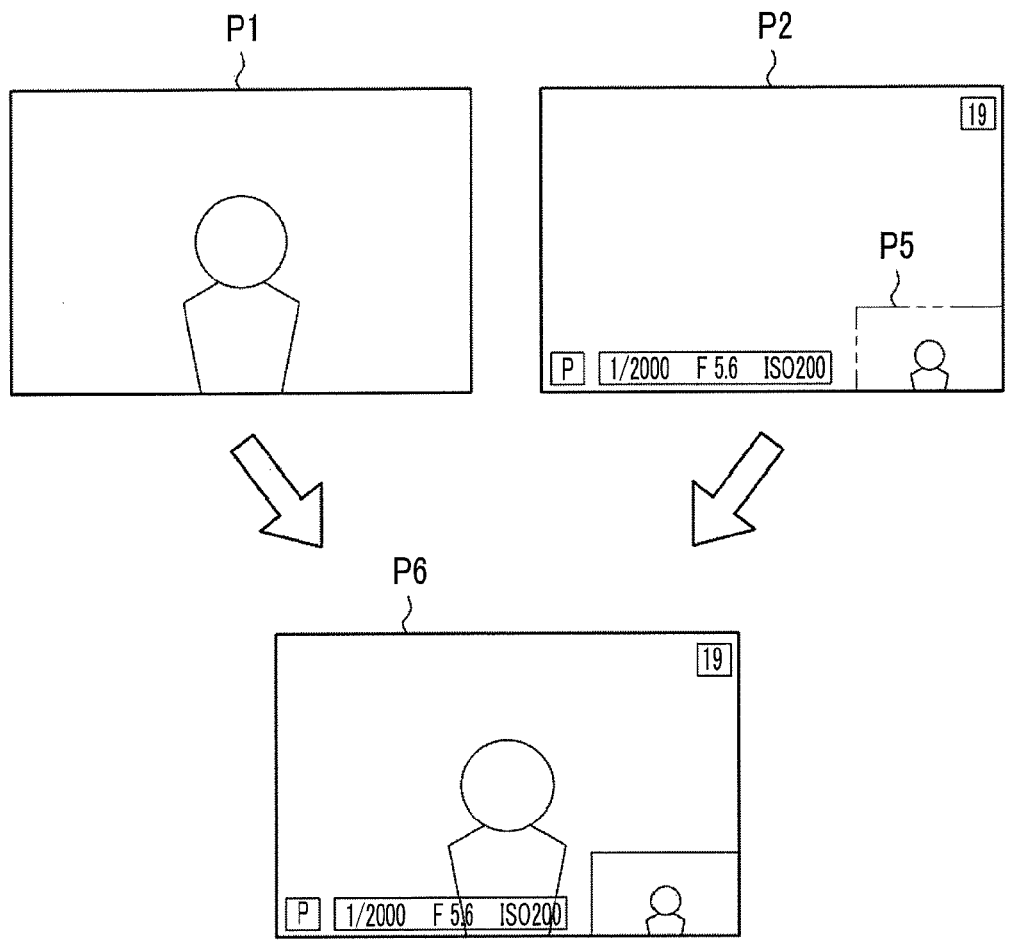
FIG. 20 is a diagram illustrating a hybrid image in which an optical image, an information image, and a subject image overlap.

The EVFLCD 42 displays nothing as a black screen in the subject display area 80, displays the information image in the information display area 81, and displays the subject image in the sub-display area 82. At this time, the first area 83 of the EVF shutter 45 is set at the low transmittance, and the second area 84 and the third area 85 are set at the high transmittances. Therefore, the subject image and the information image are transmitted through the EVF shutter 45, propagate on the second optical path 50, are reflected by the half mirror 48, and are guided into the third optical path 51. Since the OVF shutter 44 is set to the "open state", the optical image is transmitted through the OVF shutter 44, propagates on the first optical path 49, is transmitted through the half mirror 48, and is guided into the third optical path 51. As a result, as shown in FIG. 20, a hybrid image P6, in which an optical image P1, an information image P2, and a subject image P5 overlap, is guided into the finder eyepiece section 16b.

Figure 21:
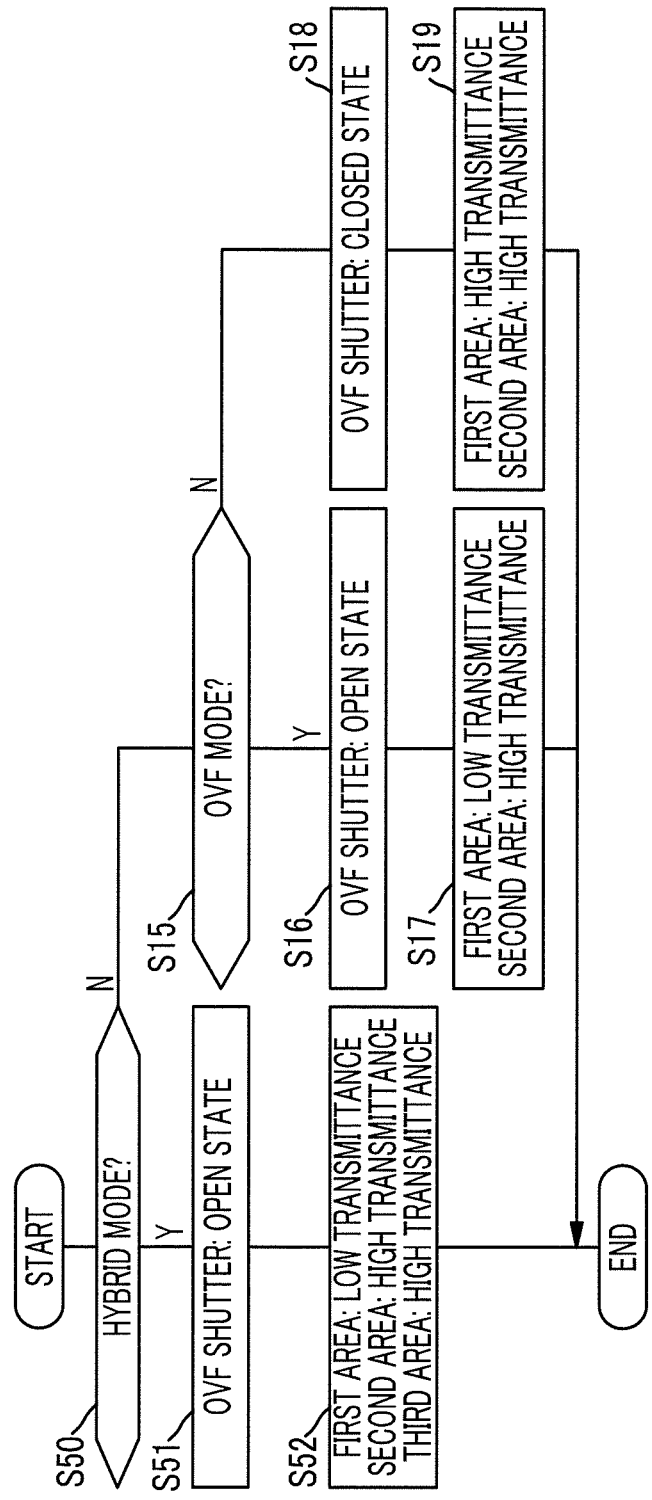
FIG. 21 is a flowchart explaining the setting process of the shutter in the hybrid mode.

Next, setting processes of the OVF shutter 44 and the EVF shutter 45 in the hybrid mode will be described. As shown in FIG. 21, in a case where it is determined that the current mode is the hybrid mode (Y in S50), the OVF shutter 44 is set to the open state (S51). In the EVF shutter 45, the first to third areas 83 to 85 are set, the first area 83 is set at the low transmittance, and the second area 84 and the third area 85 are set at the high transmittance (S52).

Hereinafter, nothing is displayed in the subject display area 80 of the EVFLCD 42, the information image is displayed in the information display area 81, and the subject image is displayed in the sub-display area 82. As a result, the above-mentioned hybrid image P6 is guided into the finder eyepiece section 16b. The following steps are the same as those of the first embodiment.

In contrast, in a case where it is determined that the current mode is not the hybrid mode in step S50, the current process follows the same steps in the first embodiment. Therefore, the steps are represented by the same reference numerals, and thus a description thereof will be omitted.

As described above, in the hybrid mode, both the optical image and the subject image are displayed in the hybrid image. Therefore, it is possible to check an image which is actually captured while observing an optical image of a subject.

Also in the hybrid mode of the sixth embodiment, the AF frame 61 described in the second embodiment can be displayed. In this case, it is preferable that the AF frame 61 is displayed in the subject display area 80, and the subject image corresponding to a part in the AF frame 61 is displayed in the sub-display area 82 in an enlarged manner. Thereby, it is possible to check focusing on the basis of the image displayed in the sub-display area 82.

In the above-mentioned embodiment, as shown in FIG. 3, an optical path, in which light transmitted from the first optical path 49 through the half mirror 48 and light reflected from the second optical path 50 by the half mirror 48 are combined, is set as the third optical path 51, and the finder eyepiece section 16b is disposed on the third optical path 51. However, on the contrary, the optical path, in which the light reflected from the first optical path 49 by the half mirror 48 and the light transmitted from the second optical path 50 through the half mirror 48 are combined, may be set as the third optical path, and the finder eyepiece section 16b may be disposed on the third optical path 51.

In the above-mentioned embodiment, the solid-state imaging element 31 is a CMOS image sensor, but may be a charge coupled device (CCD) image sensor.

The OVF shutter 44 and the EVF shutter 45 employs liquid crystal shutters, but may employ electro chromic (EC) shutters. Further, not only the shutter of which the light transmittance is electrically variable like a liquid crystal shutter or an EC shutter but also a mechanic shutter may be used.

Further, the present invention can be applied to not only a digital camera, but also imaging devices such as a video camera, a mobile phone, and a smartphone.

EXPLANATION OF REFERENCES 11, 70 digital camera
16 finder device
16a finder window
16b finder eyepiece section
21 finder switch lever
31 solid-state imaging element
32 main control section
35 digital signal processing section
42 EVFLCD (display section)
43 prism
44 OVF shutter (optical shutter)
45 EVF shutter (dimming section)
46, 80 subject display area
47, 81 information display area
48 half mirror (optical path combining section)
49 first optical path
50 second optical path
51 third optical path
52, 83 first area
52, 84 second area
55 backlight
56 liquid crystal panel
60 angle-of-view frame (first frame)
61 AF frame (second frame)
71 illuminance detection section
82 sub-display area
85 third area
P1 optical image
P2 information image
P3 OVF image
P4 frame image
P5 subject image
P6 hybrid image

What is claimed is:

1. An imaging device comprising:
an imaging element that generates image data by capturing an optical image of a subject;
a finder window through which the optical image is incident;
a display section in which a subject display area and an information display area are set and which displays a subject image based on the image data in the subject display area and displays an information image based on imaging information in the information display area;
an optical path combining section that obtains a third optical path by combining a first optical path, along which the optical image incident through the finder window propagates, and a second optical path along which a display image displayed on the display section propagates;
a finder eyepiece section that is disposed on the third optical path;
an optical shutter that is provided on the first optical path;
a dimming section that is provided on the second optical path so as to make a light transmittance corresponding to the subject display area variable at least between a low transmittance and a high transmittance; and a control section that makes an optical viewfinder mode and an electronic viewfinder mode executable and sets the light transmittance, which corresponds to the subject display area of the dimming section, as the low transmittance in the optical viewfinder mode, where the optical viewfinder mode is a mode of displaying the information image and not displaying the subject image so as to guide the optical image and the information image into the finder eyepiece section in a state where the optical shutter is open, and the electronic viewfinder mode is a mode of displaying the information image and the subject image so as to guide the information image and the subject image into the finder eyepiece section in a state where the optical shutter is closed.

2. The imaging device according to claim 1,
wherein in the display section, the subject display area, the information display area, and a sub-display area smaller than the subject display area is set, and
wherein the control section makes a hybrid mode executable, and sets the light transmittance, which corresponds to the subject display area of the dimming section, as the low transmittance in the hybrid mode, where the hybrid mode is a mode of displaying the information image in the information display area and displaying the subject image in the sub-display area without displaying the subject image in the subject display area so as to guide the optical image, the information image, and the subject image into the finder eyepiece section in a state where the optical shutter is open.

3. The imaging device according to claim 1, wherein in the optical viewfinder mode, the control section allows a first frame, which indicates an imaging area, and a second frame, which indicates a focus position, to be displayed in the subject display area, and sets the light transmittance, which corresponds to the subject display area, as the high transmittance, when at least one of the first frame and the second frame is displayed.

4. The imaging device according to claim 3, further comprising a luminance detection section that detects a luminance of the subject on the basis of the image data,
wherein the dimming section makes the light transmittance be variable in a stepwise manner between the low transmittance and the high transmittance, and
wherein in the optical viewfinder mode, the control section sets the light transmittance, which corresponds to the subject display area, as a value corresponding to the luminance.

5. The imaging device according to claim 1, further comprising a luminance detection section that detects a luminance of the subject on the basis of the image data,
wherein in the optical viewfinder mode, the control section sets the light transmittance, which corresponds to the subject display area, as the high transmittance when the luminance is equal to or greater than a predetermined value.

6. The imaging device according to claim 1, further comprising an illuminance detection section that detects an ambient illuminance,
wherein in the optical viewfinder mode, the control section sets the light transmittance, which corresponds to the subject display area, as the high transmittance when the illuminance is equal to or greater than a predetermined value.

7. The imaging device according to claim 1, wherein the information display area is set to have a frame shape surrounding the subject display area.

8. The imaging device according to claim 2, wherein the information display area is set to have a frame shape surrounding the subject display area, and the sub-display area is positioned such that a center of the sub-display area deviates from a center of the subject display area.

9. The imaging device according to claim 1, wherein the optical path combining section is a half mirror.

10. The imaging device according to claim 1, wherein the dimming section is a liquid crystal shutter.

11. The imaging device according to claim 1, wherein the imaging information includes at least any one of a shutter speed, an aperture value, and an ISO sensitivity.

12. A control method for an imaging device including
an imaging element that generates image data by capturing an optical image of a subject,
a finder window through which the optical image is incident,
a display section in which a subject display area and an information display area are set and which displays a subject image based on the image data in the subject display area and displays an information image based on imaging information in the information display area,
an optical path combining section that obtains a third optical path by combining a first optical path, along which the optical image incident through the finder window propagates, and a second optical path along which a display image displayed on the display section propagates,
a finder eyepiece section that is disposed on the third optical path,
an optical shutter that is provided on the first optical path, and
a dimming section that is provided on the second optical path so as to make a light transmittance corresponding to the subject display area variable at least between a low transmittance and a high transmittance,
the control method comprising
executing an optical viewfinder mode and an electronic viewfinder mode selectively, and setting the light transmittance, which corresponds to the subject display area of the dimming section, as the low transmittance in the optical viewfinder mode, where the optical viewfinder mode is a mode of displaying the information image and not displaying the subject image so as to guide the optical image and the information image into the finder eyepiece section in a state where the optical shutter is open by controlling the optical shutter and the display section, and the electronic viewfinder mode is a mode of displaying the information image and the subject image so as to guide the information image and the subject image into the finder eyepiece section in a state where the optical shutter is closed.

* * * * *